United States Patent Office 2,724,004
Patented Nov. 15, 1955

2,724,004

PREPARATION OF 1,1-DIFLUORO-1,2,2-TRICHLOROETHANE

Marvin R. Frederick, Wadsworth, Ohio, assignor to The B. F. Goodrich Company, New York, N. Y., a corporation of New York No Drawing. Application April 8, 1952,
Serial No. 281,262

3 Claims. (Cl. 260—653)

This invention relates to a novel method for the preparation of 1,1-difluoro-1,2,2-trichloroethane, by reacting tetrachloroethylene with hydrogen fluoride in the presence of a pentavalent antimony halide.

Henne and Plueddeman (J. A. C. S. 65, 1271–2) reported that hydrogen fluoride would not add to tetrachloroethylene at 160° C. Later, Henne and Arnold (J. A. C. S. 70, 758–60) reported the addition of hydrogen fluoride to tetrachloroethylene in the presence of boron trifluoride at 140 to 180° C., resulting in essentially the monofluoro compounds 1-fluoro-1,1,2,2-tetrachloroethane and 1-fluoro-1,2,2-trichloroethylene, with total conversion less than 20% and corresponding low yields.

I have now discovered quite unexpectedly that tetrachloroethylene and anhydrous hydrogen fluoride may be made to react in the presence of chlorine containing antimony pentahalides at reasonable reaction temperatures to give 1,1-difluoro-1,2,2-trichloroethane in good yield. This novel reaction is a new, convenient and inexpensive method for preparing 1,1-difluoro-1,2,2-trichloroethane, which is an intermediate in the preparation of the useful monomer 1,1-difluoro-2,2-dichloroethylene.

It is quite surprising that this reaction takes place so readily and in such good yield because of the symmetrical or balanced electron character and possible steric factors involved in tetrachloroethylene.

In the practice of my invention, tetrachloroethylene, an excess of anhydrous hydrogen fluoride and a small amount of antimony pentachloride as catalyst are charged to a pressure autoclave equipped with means for heating and agitation. The reaction is conducted at about 150° C. for 3 to 6 hours. The product is collected, washed with dilute hydrochloric acid and water, dried and distilled. Yields of the difluoro compound 1,1-difluoro-1,2,2-trichloroethane in excess of 70% are obtained. Some of the monofluoro compound, 1-fluoro-1,1,2,2-tetrachloroethane, is also formed and may be recovered by means of the distillation step. The amount of the monofluoro material resulting may be decreased by increasing the amount of catalyst, hydrogen fluoride and the reaction time. The optimum conditions described hereinafter will demonstrate the effect of these factors.

The monofluoro material may be readily converted in good yield to the difluoro compound of this invention, after separation, by the same reaction utilized to prepare the difluoro compound from tetrachloroethylene hereinbefore described. Continuous operation of the reaction of tetrachloroethylene, hydrogen fluoride and antimony pentachloride converts the monofluoro material to the difluoro compound without the necessity of separation and a further reaction step. The reaction is equally suited to batch or continuous operation, the latter being preferred because of increased yields and less time-consuming operations.

An excess of anhydrous hydrogen fluoride is essential to obtain the highest yields of 1,1-difluoro-1,2,2-trichloroethane. The amount of excess over molar requirements for reaction with tetrachloroethylene will be dictated by operating and economic considerations. The total percent yield of fluorinated product obtained does not increase appreciably with excesses of 25 to 150% hydrogen fluoride, but a large excess is necessary to obtain optimum conversion of the reacting reagents to the difluoro compound. For example, with all other variables held constant, an excess of hydrogen fluoride gives the following conversion in percent to the monofluoro ($F_1$) and difluoro ($F_2$) compounds.

| Excess HF (Mol) | Conversion, percent | |
|---|---|---|
|  | $F_1$ | $F_2$ |
| 25 percent | 34.8 | 50.5 |
| 100 percent | 18.0 | 61.0 |
| 150 percent | 8.2 | 71.0 |

A molar excess of hydrogen fluoride, between 100 and 200% is preferred. Commercially redistilled anhydrous hydrogen fluoride is satisfactory.

The catalyst employed in this reaction is a chlorine containing pentavalent antimony halide of the general formula $SbF_xCl_y$, where $x+y=5$, $x$ is 0 to 3, and $y$ is 2 to 5. The preferred material is antimony pentachloride, $SbCl_5$, but an antimony trichloride-chlorine complex or an antimony fluoride chloride such as $SbF_3Cl_2$ may be utilized.

The amount of the catalyst used in this reaction is based upon the weight of tetrachloroethylene charged. No reaction between tetrachloroethylene and hydrogen fluoride occurs in the absence of the catalyst even at 300° C. The total yield of fluorinated product is not appreciably increased by using amounts of catalyst over the minimum required, but conversion to the difluoro compound may be increased by increasing the amount of catalyst. From 2 to 15% antimony pentachloride, calculated on the amount of tetrachloroethylene employed, is a useful range of catalyst. Three percent catalyst gives good total conversion, while use of six to ten percent results in better yields of the difluoro compound. Six to twelve percent is the preferred amount of catalyst utilized.

The rejection will take place at 120° C. under autogenous pressure, but is slow, total yields are low, and the percent of monofluoro material produced is high. A useful reaction range is from 100 to 250° C. The preferred temperature for this reaction is about 150° C. Reaction at temperatures above 150° C., i. e., 200° C. and 250° C. are satisfactory but do not result in essentially better total yield or conversion to the difluoro compound than reactions at 150° C., even when conducted for long periods of time.

The reaction time required for obtaining optimum yields of product at 150° C. is about three hours. Longer reaction periods do not result in appreciably higher total yields, but may give greater yields of the difluoro compound under some conditions. Two to four hours are sufficient to give good product yields.

The reaction may be carried out in vessels constructed of the usual materials for high pressure and temperature autoclaves, but nickel or monel are preferred at reaction temperatures above 100° C. Pressures developed during the reaction at 150° C. are about 1000 p. s. i., and the vessels should be equipped with pressure safety devices. Glass lined vessels are particularly subject to attack by hydrogen fluoride and should be avoided. Hydrogen fluoride is very corrosive to the skin and precautions must be taken to protect operators from such contact. Antimony pentachloride is both toxic and corrosive and breathing of the fumes should be avoided. Tetrachloroethylene and the fluorine products are toxic and breathing of these vapors should be avoided.

Example 1,1-difluoro-1,2,2-trichloroethane is prepared by reacting tetrachloroethylene and anhydrous hydrogen fluoride together in the presence of antimony pentachloride by the following general procedure: 4 moles of redistilled tetrachloroethylene and 40 grams (6% based on the weight of tetrachloroethylene) of antimony pentachloride are charged to a nickel lined bomb equipped with a safety seal rated at 8,000 to 10,000 p. s. i., and an inlet valve for charging the hydrogen fluoride. The bomb is sealed and cooled in a dry ice-acetone bath, and 10 moles (25% excess) of anhydrous hydrogen fluoride is pressured into the bomb with nitrogen. The bomb is placed in a shaker and heated to 150° C. in about 1 hour and held at this temperature for 3 hours. The bomb is cooled to 40° C. and vented through a scrubbing bottle containing water. The product so collected is added to that remaining in the bomb and washed twice with 10% hydrochloric acid, then water, decanted off and dried over anhydrous calcium chloride. Rectification at a 10:1 reflux ratio yields about 2.16 moles of 1,1-difluoro-1,2,2-trichloroethane and 1.42 moles of 1-fluoro-1,1,2,2-tetrachloroethane.

The conversion to the difluoro compound is 54% and to the monofluoro compound 35%. The total yield is 85%.

It will be understood that my invention is not intended to be limited to the example but only as required by the spirit and scope of the appended claims.

Having described my invention and a representative embodiment, I claim:

1. The method for preparing 1,1-difluoro-1,2,2-trichloroethane which comprises reacting tetrachloroethylene with an excess of hydrogen fluoride under pressure in the presence of 2 to 15% antimony pentachloride, calculated on the amount of tetrachloroethylene employed, at a reaction temperature of from 100 to 250° C.

2. The method for preparing 1,1-difluoro-1,2,2-trichloroethane which comprises reacting tetrachloroethylene with from about 100 to 200% molar excess of anhydrous hydrogen fluoride under pressure in the presence of 6 to 12% antimony pentachloride, calculated on the amount of tetrachloroethylene employed, at a reaction temperature of 120 to 250° C.

3. The method for preparing 1,1-difluoro-1,2,2-trichloroethane which comprises reacting tetrachloroethylene with about 100% molar excess of anhydrous hydrogen fluoride under pressure in the presence of about 6% antimony pentachloride, calculated on the amount of tetrachloroethylene utilized, at a reaction temperature of about 150° C. for about 2 to 4 hours.

References Cited in the file of this patent
UNITED STATES PATENTS

| | | |
|---|---|---|
| 2,005,710 | Daudt et al. | June 18, 1935 |
| 2,622,106 | Stover | Dec. 16, 1952 |
| 2,637,747 | McBee | May 5, 1953 |